United States Patent [19]

Bascou

[11] Patent Number: 4,574,285

[45] Date of Patent: Mar. 4, 1986

[54] REMOTE CONTROL DEVICE HAVING A PIVOTING CASE COVER

[75] Inventor: Jacques Bascou, Maule, France

[73] Assignee: Regie Nationale des Usines Renault, Boulogne-Billancourt, France

[21] Appl. No.: 581,100

[22] Filed: Feb. 17, 1984

[30] Foreign Application Priority Data

Feb. 17, 1983 [FR] France ............................... 83 02554

[51] Int. Cl.$^4$ ........................ G08C 19/00; H04Q 9/00

[52] U.S. Cl. .......................... 340/825.69; 340/825.56; 361/422; 455/128

[58] Field of Search ................................ 455/128, 95; 340/825.56, 825.69, 825.72, 546; 361/422; 362/200, 202, 203, 204, 205

[56] References Cited

U.S. PATENT DOCUMENTS

| | | | |
|---|---|---|---|
| 2,234,876 | 3/1941 | Rehrer . | |
| 2,762,907 | 9/1956 | Schwartz . | |
| 3,289,085 | 11/1966 | Leland | 325/119 |
| 3,665,475 | 5/1972 | Gram | 343/225 |
| 3,700,835 | 10/1972 | Rackson . | |
| 3,701,016 | 10/1972 | Bennett et al. | 325/16 |
| 4,183,177 | 1/1980 | Kurdziel . | |
| 4,442,478 | 4/1984 | Stansbury | 362/191 |

FOREIGN PATENT DOCUMENTS

| | | |
|---|---|---|
| 2331065 | 5/1975 | Fed. Rep. of Germany . |
| 1275194 | 9/1961 | France . |
| 2280963 | 2/1976 | France . |
| 2420008 | 10/1979 | France . |
| 2494534 | 5/1982 | France . |

*Primary Examiner*—Donald J. Yusko
*Assistant Examiner*—Sharon L. Hodgkins
*Attorney, Agent, or Firm*—Oblon, Fisher, Spivak, McClelland & Maier

[57] ABSTRACT

This invention has as its object an infrared emitter. The case of a remote control device has a cover (14) doubly hinged around an axis (X—X) around which it can swivel to carry out the push button function that makes possible the activation of an infrared emitter in the case. The case is also hinged around a movable second axis of articulation (Y—Y) around which it is made to rotate when it is desired to replace the direct current power source (18) which is attached to the cover (14). The locking and unlocking means for the opening of the case by swivelling of the cover (14) around the second axis of articulation (Y—Y) consists of the hinge pin (50) of the hinge (42) that defines the first axis of articulation (X—X) of the cover.

8 Claims, 7 Drawing Figures

REMOTE CONTROL DEVICE HAVING A PIVOTING CASE COVER

This invention relates to an emitter for a remote control device for a locking element of at least one lock and relates more particularly to emitters used for controlling the locking or unlocking of motor vehicle locks.

Remote control devices currently used in automobiles, such as those described in French Pat. No. 2,420,008 comprise an infrared emitter having a case in which are mounted a direct current power source, a device for generating a coded message, and a device for emitting said message whose operation is controlled by a push button.

In currently marketed devices of this type, such as are found in the motor vehicles produced by Regie Nationale Des Usines Renault, the push button consists of a deformable portion of the body of the case that is deformed by pressing it so as to cause the closing of an electrical contact. This requires a careful construction of the body of the case and particularly of the thicknesses of materials in the deformable zone that constitutes the push button.

Moreover, the direct current power source consists of one or more batteries generally in the shape of a disk and located inside the case and connected to one another by various electrical connections. It is found in practice that when replacing these batteries, the user damages the contacts and the electrical connections by deforming them or by dirtying them.

SUMMARY OF THE INVENTION

The invention has as its object to propose a new emitter having a case which eliminates the main drawbacks of existing boxes which have just been described.

For this purpose, the invention proposes an emitter in which the push button consists of a part of the case of the emitter forming the cover, said cover being hinged on said case around a first axis located in the vicinity of a first end of the cover.

This swivelling of the cover makes it possible to act on an electric contact mounted in the body of the case in the vicinity of the second end of the cover to cause the transmission of said coded message.

According to another characteristic of the invention, said direct current power source is mounted in the cover. Thus, it is understood that it is capable of swivelling with the cover during the opening of the case, particularly for the purpose replacing it. In the embodiment shown in the Figures, the current source consists of at least one electric battery whose connection terminals work with corresponding electric contacts fixed to the body of the case. As a result of this structure, it is easily understood that the user, when replacing the batteries, does not have to act on the contacts and the electrical connections, but only to insert or remove the batteries from the cover to which they are attached.

According to another characteristic of the invention, the cover is hinged on the case around a second axis of articulation parallel to the first axis of articulation and located in the vicinity of the second end of the cover, locking and unlocking means being provided to prevent any swivelling of the cover around the second axis of articulation during normal use of the emitter and to make possible this swivelling when it is desired to replace the direct current source, for example consisting of batteries.

BRIEF DESCRIPTION OF THE DRAWINGS

Other important essential characteristics of the invention will be brought out in the reading of the following detailed description of an embodiment of the invention with reference to the accompanying drawings in which.

DETAILED DESCRIPTION OF THE PREFERRED EMBODIMENTS

Figure 1:
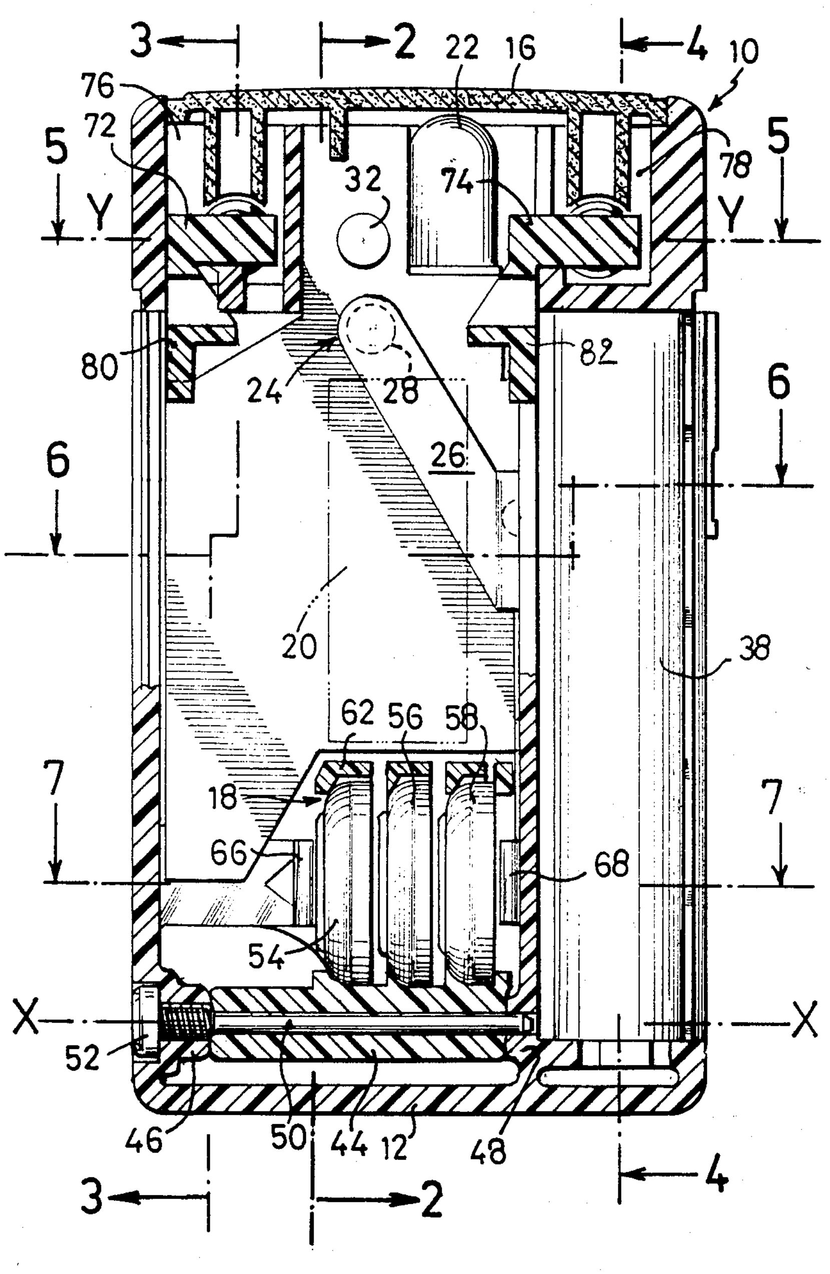
FIG. 1 is a view in section of an emitter along line 1—1 of FIG. 2.

The emitter shown in the figures comprises a case 10 with a general rectangular parallelepipedic shape which consists essentially of three elements, a body 12, a cover 14 and a cap 16. Body 12 and cover 14 are made of a thermoplastic material, cap 16 being made of transparent polycarbonate. Emitter 10 contains essentially a direct current power source 18, a device for generating a coded message 20 outlined in the figures which comprises essentially electronic components and a device for emitting the coded message comprising essentially an infrared-emitting diode 22 placed inside case 10 and which is capable of emitting through the cap of polycarbonate 16 waves which can be received by a reception device mounted inside the motor vehicle whose lock it is desired to open. Case 10 also contains an electric contact 24 consisting of a deformable and elastic metal strip 26 capable of being brought into contact with a contact stud 28, a device for monitoring the proper operation of the emitting device, consisting of a light-emitting diode 32 whose light emission can be perceived through an opening 34 made opposite it in the body of case 12. In addition, the emitter shown in the figures includes a key ring with a retractable key 36 mounted in a barrel 38, itself mounted in body 12 of emitter 10; this key ring structure has been described in detail in U.S. patent application Ser. No. 473,748, now U.S. Pat. No. 4,524,594 filed on Mar. 9, 1983, and which is incorporated by reference.

Electric contact 24 described above must be able to be operated by the user of the infrared emitter 10 who desires to cause the locking or unlocking of a lock by means of a push button, an action on this contact actually resulting in supplying direct current to the device 20 for generating the coded message and its emission device 22 and for supplying monitoring element 32.

According to the invention, the push button for controlling electric contact 24 consists of rectangular cover 14 itself which is hinged on case 12 around a first axis of articulation X—X located in the vicinity of a first end 40, or lower end (with reference to the figures) of cover 14.

In the embodiment illustrated in the figures, the geometrical axis of articulation X—X consists of a hinge 42 formed of a movable knuckle 44 unitary with cover 14 and extending over a large part of the width of this cover, which is received between two portions 46 and 48 constituting the stationay knuckles of the hinge and unitary with body 12 of case 10. Hinge 44 includes also a hinge pin 50 consisting of a screw whose smooth end part penetrates into movable knuckle 44 and stationary knuckle 48 and whose shank located within the stationary knuckle 46 is threaded in the vicinity of head 52 so as to be able to be screwed in body 12 of the case. Thus it is understood that the hinge pin consisting of screw 50 can be removed using a screwdriver by acting on screw head 52 from the outside of the case, which may be done for a purpose which will be described below.

Direct current power source 18, which in the embodiment consists of three batteries in the shape of cylinder sections 54, 56 and 58 mounted in series is, according to the invention, mounted in cover 14. Actually, each of the batteries is mounted with clearances in a container delimited, on the one hand, by upper face 60 of movable knuckle 44, and, on the other hand, by an upper arm 62 unitary with cover 14 and which has a curved end 64 which extends over the periphery of the battery so as to keep it held captive in its corresponding housing. As can be seen in FIG. 1, each battery is received in its housing with a clearance in the direction of axis X—X so as to assure that the three batteries are in reciprocal contact and thus that the series mounting is definitely achieved. The electrical connection of power source 18 consisting of the three batteries is made by two electric contacts 66 and 68 attached to body 12 of case 10. Electric contact 66 consists of a metal strip curved so as to possess a certain elasticity which makes it possible, on the one hand, to assure a good contact between contact 66 itself and the connection terminal of battery 54 opposite it and, on the other hand, between each of batteries 54, 56 and 58 in cooperation with contact 68 which is of a similar structure. Electric contact 66 is connected to the device 20 for coding the message while contact 68 is the lower projection of electric contact 26 which, as has been described above, makes it possible to bring about the operation of the emitter.

According to another aspect of the invention, cover 14 is also hinged on body 12 of case 10 around a second geometric axis of articulation Y—Y parallel to the first axis of articulation X—X and located in the vicinity of second end 70 of cover 14, i.e., at its upper end (looking at the figures) opposite lower end 40. This second hinging of cover 14 has as its object to make possible, as will be described below, an easy replacement of the batteries constituting direct current power source 18.

Figures 3, 4, 5, 6, 7:
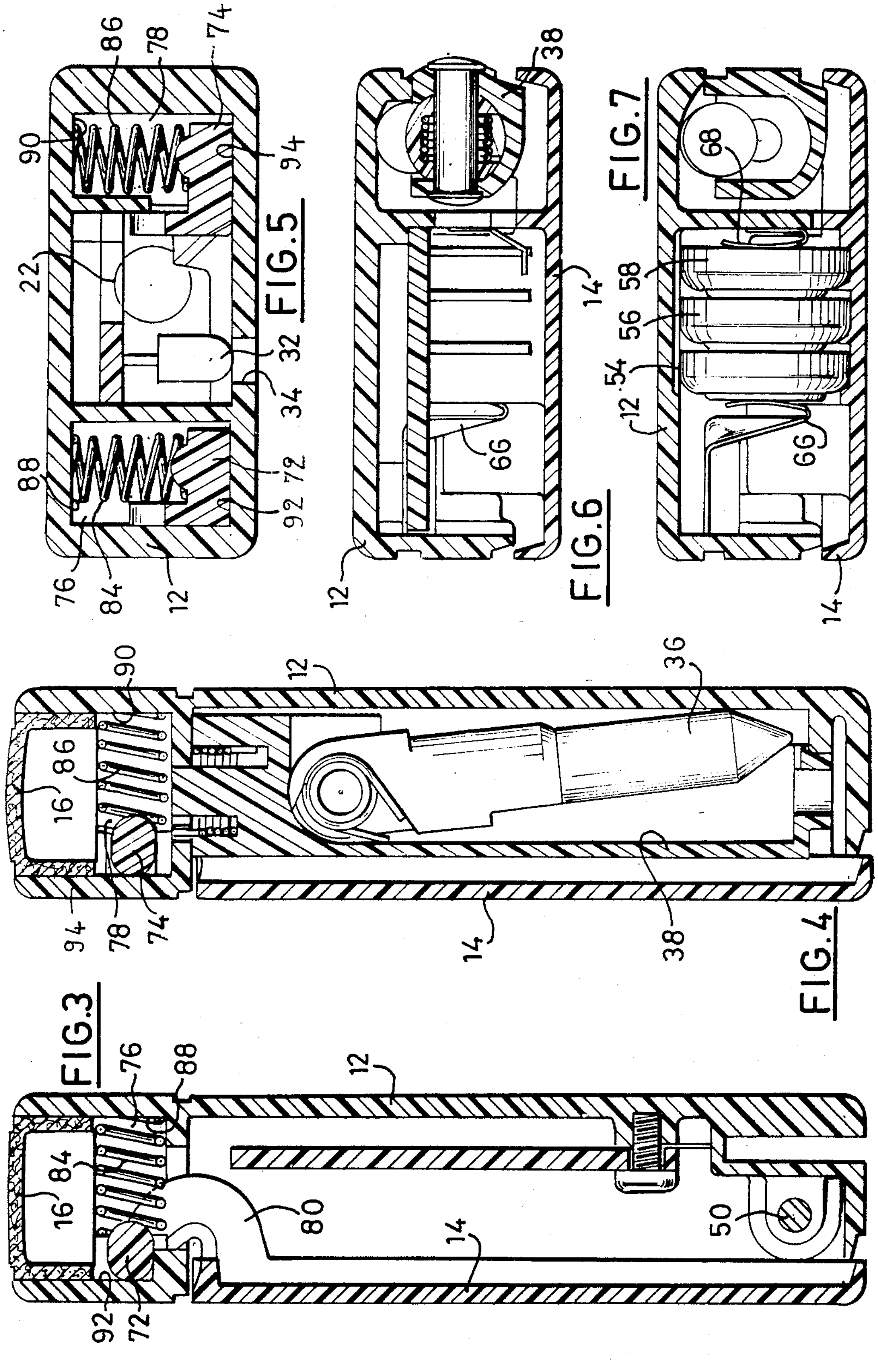
FIG. 3 is a view in section of the emitter of FIG. 1 along a line 3—3 of this Figure.
FIG. 4 is a view in section of the emitter of FIG. 1 along a line 4—4 of this Figure.
FIG. 5 is a view in section of the emitter of FIG. 1 along a line 5—5 of this Figure.
FIG. 6 is a view in section of the emitter of FIG. 1 along a line 6—6 of this Figure.
FIG. 7 is a view in section of the emitter of FIG. 1 along line 7—7 of this Figure.

The second axis of articulation Y—Y consists of two pins 72 and 74 which are unitary with cover 14 and which are held in two housings 76,78 respectively made in body 12 of case 10. Pins 72 and 74 are connected to cover 14 itself by two gooseneck extensions 80 and 82. Each of the two housings 76 and 78 receives a helical spring 84 and 86 respectively which is mounted compressed in the corresponding housing. Each of the compression springs 84 and 86 rest, on the one hand, on the bottom of housing 88, 90 and, on the other hand, on corresponding pin 72, 74. Pins 72 and 74 are thus pulled elastically to rest on the second bottom of each of said housings 92, 94 respectively. Springs 76 and 78 thus constitute the elastic return means that pull the cover to its rest position in which it rests on the stop surface constituted in body 12 of the case by housing bottoms 92 and 94 with which pins 72 and 74 work. As a result of this structure, the pins can move perpendicularly to their own axis to make possible the swivelling of the cover around the first axis of articulation X—X when it is desired to have the emitting device operate, i.e., when cover 14 is pressed to use it as a push button; this action on the cover actually resulting in its swivelling around axis X—X, pins 72 and 74 acting against the elastic force exerted by return springs 84 and 86 and moving in housings 76 and 78 in the direction of the bottoms 88 and 90 of said housings. When the user releases his pressure on cover 14, this cover returns to its rest position illustrated particularly in FIGS. 3 and 4 in which the pins are again resting on the second bottoms 92 and 94 of housings 76 and 78.

Figure 2:
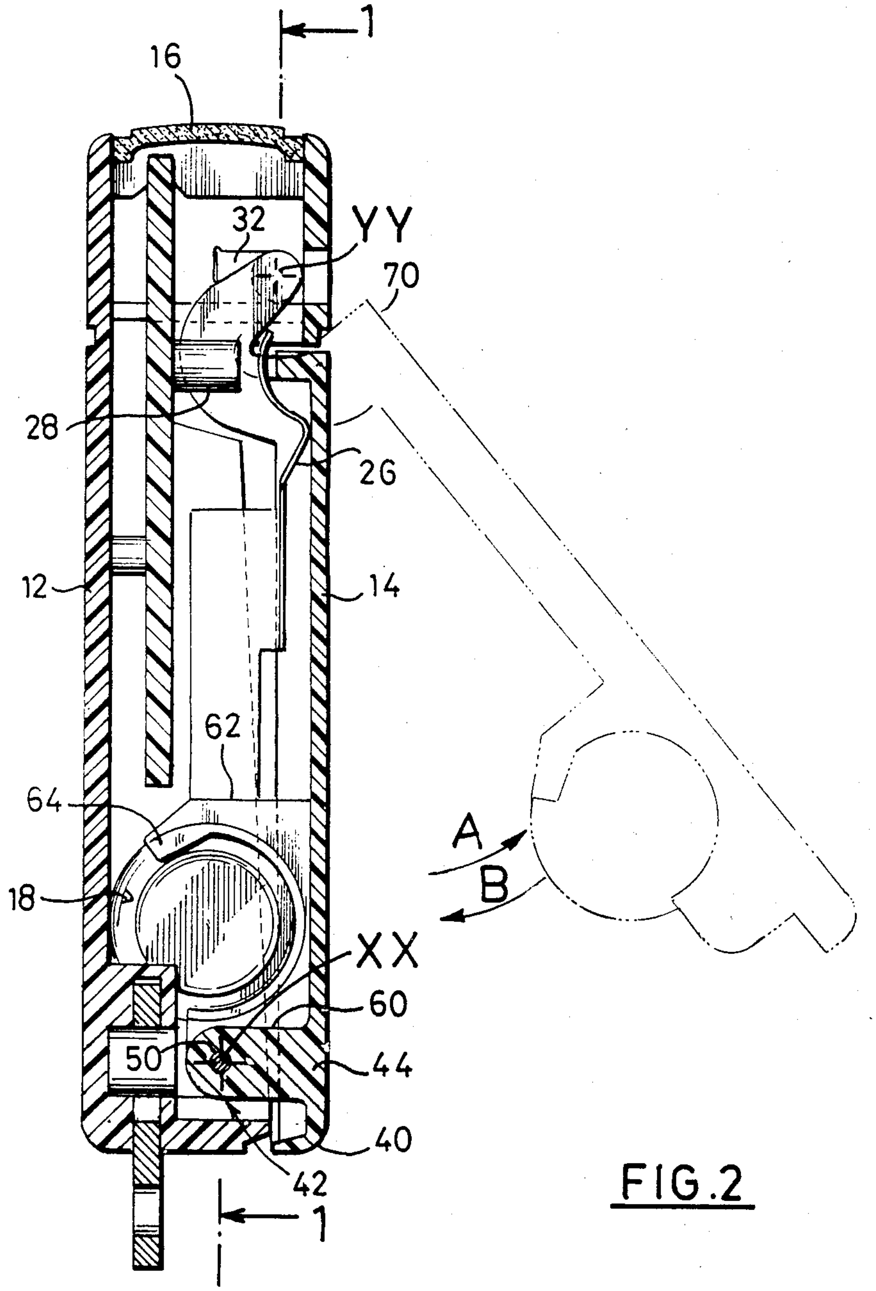
FIG. 2 is a view in section of the emitter of FIG. 1 along line 2—2 of this Figure.

According to the invention, hinge 42 comprising removable hinge pin 50 constitutes the locking and unlocking means which are provided to prevent any swivelling of cover 14 around the second axis of articulation Y—Y during normal usage of the emitter, but which makes swivelling possible when it is desired to replace the batteries. Actually, it is sufficient for the user to unscrew hinge pin 50 and to remove it from the case in order to be able then to cause cover 14 to swivel around axis Y—Y as is indicated by arrow A of FIG. 2 until this cover occupies the position shown in dot and dash lines in this same figure which is the maximum open position of the cover provided for the replacement of the batteries. In this open position, the user has only to remove the batteries from their corresponding housing by slightly deforming, in an elastic manner, arms 64 both to remove the used batteries and to insert new batteries. Once the replacement of the batteries is done, the user has only to reclose cover 14 in the direction indicated by arrow B of FIG. 2; during this maneuver, the batteries are gradually engaged between the elastic and electric contacts 66 and 68 which assure a complete electrical connection of the circuit without the user having at any time the occasion to touch these contacts at the risk, in particular, of deforming them. When the cover again occupies its normal rest position, the user can reinsert hinge pin 50 into knuckles 44, 46 and 48, and then can rescrew head 52 of the screw to immobilize hinge pin 50 in relation to case 10. The emitter is again ready for its normal use during which cover 14 is free to swivel only around the first axis of articulation X—X for its use as a push button.

Obviously, numerous modifications and variations of the present invention are possible in light of the above teachings. It is therefore to be understood that within the scope of the appended claims, the invention may be practiced otherwise than as specifically described herein.

I claim:

1. An emitter for a remote control device for a locking element, comprising:

- a case, a portion of said case forming a cover, said cover being hinged on said case around a first axis of articulation located in the vicinity of a first end of said cover, said cover also being hinged on said case around a movable second axis of articulation parallel to said first axis of articulation and located in the vicinity of a second end of said cover;
- a direct current power source mounted in said case;
- means mounted in said case for generating a coded message;
- electric contact means in said case, said contact means being positioned in said case so as to be actuated by means associated with said second end of said cover upon said cover pivoting about said first axis;

means operatively connected to said direct current power source, said contact means and said means for generating a coded message, for emitting said coded message in response to actuation of said contact means;

means for biasing said second axis of articulation to a position such that said contact means is not actuated by said means associated with said second end of said cover; and locking and unlocking means for selectively fixing said first axis of articulation;

whereby when said first axis of articulation is fixed by said locking and unlocking means, said cover can pivot about said first axis and in opposition to said means for biasing for actuating said contact means, and whereby when said first axis of articulation is not fixed by said locking and unlocking means, said cover can pivot about said second axis of articulation to open said cover.

2. The emitter of claim 1, wherein said direct current power source is mounted on said cover.

3. The emitter of claim 2 in which said power source consists of at least one electric battery whose connection terminals are engageable with corresponding elastic contacts fixed to said case when said cover is in a closed position.

4. The emitter of claim 1, wherein said first axis of articulation is defined by a hinge having a hinge pin removable from outside of said case, wherein said locking and unlocking means consist of hinge pin.

5. The emitter of claim 4, wherein said hinge pin comprises a smooth extension of a screw having a threaded part screwed into said case.

6. The emitter of claim 1, wherein said second axis of articulation is defined by two pins attached to said cover and held in two housings made in said case whereby said pins rotate to make possible the swivelling of the cover around said second axis of articulation and, on the other hand, move perpendicularly to said second axis in said housings to make possible the swivelling of said cover around said first axis of articulation.

7. The emitter of claim 6, wherein said means for biasing consist of a compression spring placed in each said housing, each said spring being compressed between a first wall of said housing and one said pin.

8. The emitter of claim 7, wherein a wall of each of said housings opposite said first wall and on which said pin rests when the cover occupies a rest position comprises a stop surface of said case.

* * * * *